United States Patent [19]

Lang

[11] 4,000,216

[45] * Dec. 28, 1976

[54] SURFACE ALTERING AGENT FOR THERMOPLASTIC POLYMERS

[75] Inventor: E. Reed Lang, Glenside, Pa.

[73] Assignee: Rohm and Haas Company, Philadelphia, Pa.

[*] Notice: The portion of the term of this patent subsequent to Nov. 16, 1993, has been disclaimed.

[22] Filed: Aug. 31, 1973

[21] Appl. No.: 393,384

Related U.S. Application Data

[60] Continuation-in-part of Ser. No. 372,382, June 21, 1973, which is a division of Ser. No. 113,841, Feb. 9, 1971, abandoned, which is a continuation-in-part of Ser. No. 74,250, Sept. 22, 1970, abandoned, and a continuation-in-part of Ser. No. 113,843, Feb. 9, 1971, which is a continuation-in-part of Ser. No. 74,344, Sept. 22, 1970, abandoned.

[52] U.S. Cl. .................. 260/857 UN; 260/857 G; 260/859 PV; 260/873; 260/876 R; 260/885; 260/886

[51] Int. Cl.$^2$ .................. C08L 77/00; C08L 51/00

[58] Field of Search ............... 260/876 R, 885, 886, 260/859, 873, 857 UN, 857 G

[56] References Cited

UNITED STATES PATENTS

| 3,297,791 | 1/1967 | Heaps | 260/876 R |
|---|---|---|---|
| 3,300,545 | 1/1967 | Baer | 260/876 R |
| 3,345,434 | 10/1967 | Griffith | 260/901 |

FOREIGN PATENTS OR APPLICATIONS

| 1,360,683 | 3/1964 | France | 260/876 R |
|---|---|---|---|
| 994,924 | 6/1965 | United Kingdom | 260/876 R |
| 1,205,911 | 9/1970 | United Kingdom | 260/876 R |

Primary Examiner—Wilbert J. Briggs, Sr.
Attorney, Agent, or Firm—Michael B. Fein

[57] ABSTRACT

Blends of extrudable, moldable, or heat formable thermoplastic polymers with a surface altering agent for the thermoplastic polymer comprising cross-linked polymer particles having an average size of 1 to 30 microns are disclosed. Also disclosed are processes for preparing such blends.

18 Claims, No Drawings

SURFACE ALTERING AGENT FOR THERMOPLASTIC POLYMERS

This application is a continuation-in-part of copending Ser. No. 372,382 filed June 21, 1973, which is a divisional of Ser. No. 113,841 filed Feb. 9, 1971 and now abandoned which is in turn a continuation-in-part of Ser. No. 74,250 filed Sept. 22, 1970 and now abandoned; and of copending Ser. No. 113,843 of Feb. 9, 1971 which is in turn a continuation-in-part of Ser. No. 74,344 filed Sept. 22, 1970, and now abandoned.

This invention relates to thermoplastic polymers containing a surface altering agent. By surface altering is meant changing the surface characteristics of the thermoplastic polymer.

To achieve surface altering in thermoplastic polymers, it has heretofore been the general practice to incorporate inorganic flatting agents such as calcium silicates, magnesium silicates, amorphous silica gels, and the like. The use of such inorganic particulate material has a disadvantage of causing detrimental effects on the physical properties of the thermoplastic material, such as loss of impact strength, toughness, clarity, processability, and the like. Inorganic flatting agents also suffer from poor dispersion in many cases.

Another prior method of achieving surface altering of thermoplastics has been by calendering, but such mechanical systems have the disadvantage of lack of uniform quality and limited utility in that they cannot be used in an extrusion process. Further disadvantages of mechanical flatting or surface altering are that the calendering rolls must be refinished from time to time which is of some expense and inconvenience. Also, calendering is not a flexible method in that one cannot easily vary the gloss reduction achieved; the only way to vary it is by changing the calendering rolls.

A different method of altering the surface of substrates is, of course, by applying a coating composition which is generally a synthetic resinous latex or dispersion of film forming polymer or a solution of binder in solvent. It has been suggested to achieve flatted coatings by incorporation of non-crosslinked, incompatible polymer particles in the coating composition, but such coating systems are not useful for altering the surface of thermoplastic polymers which are to be subjected to an after-treatment such as molding, heat forming, or extrusion.

It is an object of the present invention to provide a simple method for uniformly altering the surface of thermoplastic polymers. It is a further object to provide thermoplastic polymers whose surface has been altered without affecting other physical properties. A still further object is to provide for uniform, flexible, and economic flatting of thermoplastic polymers. A further object is to provide thermoplastic polymers of reduced surface gloss. An additional object is to provide flatting agents which can withstand the high temperatures used in extrusion and molding of thermoplastics.

These and other objects as will become apparent are achieved by the present invention which comprises in one aspect blends of extrudable, moldable, or heat formable thermoplastic polymers and a surface altering agent comprising cross-linked polymer particles having an average size of 1 to 30 microns. Another aspect the invention comprises a method of altering the surface of thermoplastic polymers comprising blending with the thermoplastic polymer a controlled amount of surface altering agent comprising the above mentioned cross-linked polymer particles.

The amount of surface altering agent included in the blend is usually about 0.1 to 50 weight parts per 100 weight parts of blend, preferably about 1 to 10 weight parts per 100 weight parts of blend. The exact amounts depend upon the particular surface properties desired and other factors such as the particular thermoplastic polymer being altered and the particular surface altering agent being employed.

Suitable thermoplastic polymers whose surfaces can be altered by this invention include the vinyl chloride polymers by which is meant polymers prepared from monomer systems containing at least 50% vinyl chloride, more likely over 70 or 80% vinyl chloride, and the remainder other monomers such as propylene, vinyl acetate, ethylene and the like; acrylonitrile-butadiene-styrene (ABS) copolymers, methyl methacrylate-butadiene-styrene (MBS), nylons, polyethylene terephthalate, polyethylene, polypropylene, polycarbonate, polyalkyl methacrylate, polyurethane, polystyrene, other thermoplastic polymers, and blends of two or more thermoplastic polymers. The term thermoplastic polymers is defined to exclude coating systems, i.e., binder/solvent systems, and the thermoplastic polymers to be surface altered are unsuitable for use in the coating art.

The surface altering agent can be prepared by any suitable process which results in cross-linked polymer particles having an average size of 1 to 30 microns. The preferred process is by an endopolymerization technique wherein the monomers that will ultimately form the particulate polymer surface altering agent are polymerized in the presence of a soluble preformed polymer which is dissolved in the above-mentioned monomers, and is selected so that phase separation takes place early in the polymerization process. When place separation occurs, the soluble preformed polymer becomes the continuous phase and the polymerized monomers form the particulate polymer surface altering agent as the discontinuous phase, i.e., as distinct spherical particles dispersed in the soluble preformed polymer phase. The particulate surface altering agent polymer is insoluble in the so-called "soluble" polymer and the latter becomes a carrier polymer in this technique, i.e., the original preformed polymer which was dissolved in the monomer system remains intact and, upon polymerization of the monomer system going into the particulate polymer surface altering agent, becomes the continuous phase having dispersed therein the particulate polymers of the average particle size of 1 to 30 microns.

Suitable compatible preformed carrier polymers (soluble polymers) include polymethyl methacrylate or copolymers of methyl methacrylate with less than 20% lower alkyl acrylate units as the preferred polymers. Optionally, other co-monomers can be used in small amounts, for example, styrene, vinyl acetate, vinyl chloride, or acrylonitrile. Suitable molecular weight for the compatible preformed carrier polymer is about 10,000 to about 300,000.

The suitable monomers for the surface altering agent include about 86–99.95%, preferably about 98–99.5%, of at least one monoethylenically unsaturated monomer, about 0.05 to 4% preferably about 0.5 to 2.0% of at least one polyunsaturated cross-linking monomer, and, optionally, up to about 10% of a polar monomer, all on a weight basis. Suitable monoethylenically unsaturated monomers are alkyl acrylates preferably having 4 to 8 carbon atoms in the alkyl, vinyl esters such as vinyl acetate, vinyl propionate, vinyl stearate and the styrenes including styrene and ring-substituted styrene. The preferred systems contain a major part of styrenes and a minor part of($C_4$-$C_8$) alkyl acrylate, more preferably wherein the ratio of styrenes to $C_4$-$C_8$ acrylate is at least 1.5.

While it is broadly possible to include about 0.05 to 4% of the polyunsaturated cross-linking monomer, it is much preferred to use about 0.5 to 2% based on the total weight of the monomer system. While the exact amount of cross-linking monomer varies with different monomer combinations, I have found the surface altering properties of a particular system to vary greatly with small changes in amount of cross-linking monomer, and therefore it is important to determine with care the exact amount of cross-linker to be used. Exemplary cross-linking monomers are those formed by the reaction of acrylic or methacrylic acid with ethylene, propylene, butylene, or hexamethylene glycols. In addition, divinyl benzene; divinyl or diallyl compounds, such as the divinyl ethers of the above glycols; diallyl phthalate; triallyl cyanurate; and other similar monomers having moe than one polymerizable group. Additional polyethylenically unsaturated compounds include the following: divinylpyridine, divinyltoluenes, divinylnaphthalenes, 1,3-divinylxylene, divinylethylbenzene, divinylsulfone, polyvinyl or polyallyl ethers of glycol, or glycerol, of pentaerythritol, of mono- or dithio- derivatives of glycols, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicate, triallyl tricarballylate, allyl methacrylate, triallyl citrate, triallyl phosphate, N,N'-methlenediacrylamide, N,N'-ethylenediacrylamide, 1,2-di(α-methylmethylene sulfonamido)- ethylene, trivinylbenzene, trivinylnaphthalene, and polyvinylanthracenes. Substantially any monomers having more than one addition-polymerizable olefinic group are useful. The preferred cross-linking agents have the formula:

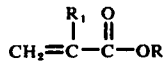

wherein $R_1$ is H or $CH_3$- and R is an ethylenically unsaturated radical. Where such compounds are substituted, the chain length of such substitutions is not critical, but usually varies from about 1 to 20, preferably about 1 to 4 carbon atoms.

Optionally, the polymer particles can be made infusible by secondary or latent cross-linking by including up to about 10 weight percent polar monomer. Generally, secondary or latent cross-linking would occur during such steps as hot roll milling, Banbury mixing or extrusion of the polymer mass. The polar monomers which are suitable for this function include those that are residues of acrylics, and can be best exemplified by the following: acrylic acid; methacrylic acid; acrylamide; methacrylamides; epoxyalkyl acrylates or methacrylates, e.g., glycidyl methacrylate; monoacrylic acid esters of glycols; hydroxyalkyl acrylates or methacrylates, isocyanatoalkyl acrylates and aminoalkyl acrylates or methacrylates, as well as other compounds described below.

Examples of the secondary or latent cross-linking reactions which are possible using heat and/or catalysis are:

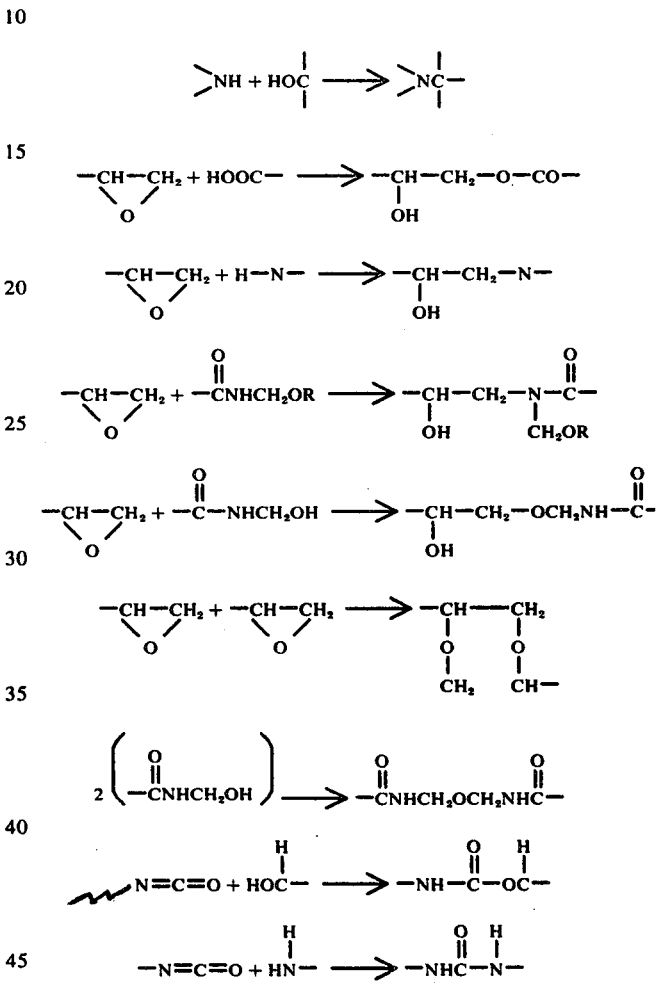

Addition polymerizable unsaturated monomers containing such groups are well known in the art, examples being isocyanates such as isocyanatoethyl methacrylate, epoxy compounds such as glycidyl methacrylate, aminoalkyl compounds such as methylaminoethyl methacrylate, and t-butylaminoethyl methacrylate, amides such as methacrylamide, guanamines such as 4-pentenoguanamine, hydroxyalkyl esters such as hydroxypropyl methacrylate and hydroxyethyl methacrylate, nitriles such as methacrylonitrile, N-alkoxyalkylamides such as methoxymethyl methacrylamide, hydroxyalkyl amides such as N-methylol methacrylamide, the analogs of the above methacrylic acid derivatives with other unsaturated acids such as acrylic acid and itaconic acid, such acids themselves, dicarboxylic acids such as maleic acid and half esters and half amides thereof, vinyl ethers of glycols such as ethylene glycol, and so forth.

As may be seen, the latently cross-linkable addition polymerizable unsaturated monomers have reactive polar groups selected from those including

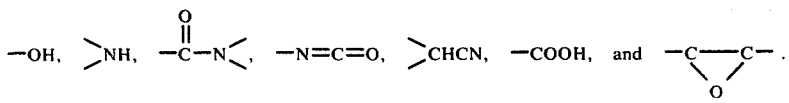

While it is not usually necessary to provide for such secondary cross-linking, in systems where it is necessary or is preferred, the secondary cross-linking monomers are present in amounts of from 0.05 to 10%, preferably from 0.1 to 3% by weight, based on the total monomers that form the particulate polymer. When such monomers are utilized, and contain alkyl groups, the groups usually contain from about 1 to 20, preferably about 1 to 4 carbon atoms. The preferred secondary cross-linking co-monomer is methacrylic acid and is usually utilized in amounts of less than 2% by weight. The polymerization is conveniently effected by conventional free radical polymerization catalysts, such as redox catalysts and peroxy compounds, heat or irradiation. In general, these catalysts are present in amounts of from about 0.02 to 1.0, preferably from about 0.2 to 0.5 weight percent, based on the total monomers that form the surface altering agent particulate polymer. The catalyst may be a combination of both high and low temperature components if it is desired that the above-noted secondary or post polymerization cross-linking be enhanced. Exemplary catalysts include benzoyl peroxide, acetyl peroxide, t-butyl peracetate, dicumyl peroxide, azoisobutyronitrile (AIBN), t-butyl hydroperoxide, t-butyl peroxy pivalate. Moreover, either heat or irradiation, or a single compound catalyst in combination with heat and/or irradiation may be utilized. Further, it should be noted that metal accelerators are often useful when irradiation catalysis is used, for example with the use of ultraviolet light. Heat or radiation functions can be used in combination with other free-radical generating materials.

If the surface altering agent polymer particles are below an average size of 1 micron they do not have the desired effect on the surface of the thermoplastic polymers, i.e., gloss reduction or anti-blocking. When the average particle size is above 30 microns, the surface texture of the extruded or molded thermoplastic polymer article becomes objectionably rough and unattractive for most applications, although such articles could be useful, possibly, for certain speciality applications. The particle size distribution can be either narrow or broad, and by proper choice of particle size range and distribution, varying surface effects can be obtained. For example, for printability a narrow distribution is preferred, whereas for gloss reduction, a broader distribution is preferred.

The surface altering agent prepared by the endopolymerization technique is a solid material at room temperature, in the form of a solid composite of the surface altering particles in a matrix of the continuous phase carrier polymer. The solid composite is preferably granulated and thereafter blended with the thermoplastic polymer in the desired amounts before or during processing of the thermoplastic.

By proper selection of monomers going into the surface altering agent polymeric particles it is possible to achieve a desired refractive index. For applications wherein clarity of the thermoplastic polymer is necessary, it is preferred to select the monomers so that the cross-linked particles have a refractive index within about 0.005 units of the refractive index of the thermoplastic/carrier polymer blend. In systems wherein clarity is not necessary or desired, the refractive index of the surface altering agent polymer particle is not important.

The surface altering properties achievable by the present invention include flatting, anti-blocking, improved printability, scuff resistance, or hiding of surface imperfections of thermoplastics. By varying the amounts of surface altering agents, one can achieve anti-blocking without necessarily flatting the thermoplastic material.

The blends of the invention are useful as single layer sheets or as laminate or other molded, cast, extruded, or heat formed articles. The blends can further include dyes, pigments, colorants, stabilizers, plasticizers, fillers, and other conventional additives. The blend can be thermoformed without affecting the surface alteration.

When the surface altering agent is prepared by the endopolymerization process, the soluble carrier polymer, i.e., the preformed polymer, should be compatible with the thermoplastic polymer which is to be altered. For example, when it is desired to prepare flatted PVC sheet, one preferred surface altering agent/carrier combination is styrene/butyl acrylate/ethyl acrylate/allyl methacrylate (6/34/3.5/1.5) as surface altering agent in methyl methacrylate/ethyl acrylate (91/9) carrier polymer.

The following Examples are presented to illustrate several embodiments of the invention but it should be understood that the invention is not in any way limited to the embodiments illustrated.

EXAMPLE 1

This example shows preparation of a surface altering agent in a performed polymer. 26.79 pounds of a preformed polymer of ethyl acrylate/methyl methacrylate copolymer (9/9′ by weight) is dissolved in a monomer system comprising 44.17 pounds of styrene monomer, 24.62 pounds of n-butyl acrylate, and 2.90 pounds of ethyl acrylate at 50° C. After 2 hours of stirring, the preformed polymer is completely dissolved in the monomer system. After the solution has been cooled to 30° C., the following ingredients are then added with appropriate stirring to insure that each is completely mixed before the next is added: 1.085 pounds of allyl methacrylate as cross-linking agent for the surface altering agent, 0.0009 pounds of oxalic acid, 0.0725 pounds of tertiary-dodecylmercaptan, 0.1449 pounds of t-butyl peroxypivalate, 0.0725 pounds of 25% acetyl peroxide solution in dimethyl phthalate, and 0.1449 pounds of dicumyl peroxide. This mixture is then polymerized in an air circulating oven for 16 hours at 66° C., 2 hours at 80° C., and then 6 hours at 120° C. The resulting ½ inch slab of polymer is broken and further granulated into particles capable of passing through a 5/16 inch mesh screen. The endopolymeric surface altering agent is characterized by a particle size range of about 1 to 35 microns in diameter, as determined by electron microscopy, the average particle size being about 1.5 microns. The acetone extractables, as an indication of degree of cross-linking, is 41% by weight, and the swelling ratio as an indication of crosslink density is 7.0.

EXAMPLE 2

This example illustrates a blend of a surface altering agent with a thermoplastic polymer. Two parts by weight of the surface altering agent/carrier polymer composition in granular form prepared in Example 1 and 100 parts by weight of polyvinyl chloride having a K value of 69 containing therein 50 parts of di(2-ethylhexyl) phthalate (DOP) as plasticizer, 2 parts by weight of dibutyltin mercaptoacetate stabilizer and 0.25 parts by weight of stearic acid lubricant are mixed together and kneaded on a roll mill for 5 minutes at 325° C. at a speed differential of 20/20 RPM to form a 15 mil thick film. The surface of the film in contact with the rolls is painted black to eliminate reflection from the second surface and the specular gloss measured at 60° angle of incidence. For comparison, a 15 mil thick film containing 2 parts by weight of an inorganic surface altering agent (amorphous silica) prepared by the same working conditions and a 15 mil thick film containing no surface altering agents, polymeric or inorganic in nature, are prepared and measured. The results are shown in Table 1.

TABLE 1

| Additive | 60° Gloss (%) | Clarity % White Light Trans. | % Haze |
|---|---|---|---|
| This invention | 13.3 | 86.3 | 13.7 |
| Amorphous Silica Gel | 38.5 | 83.5 | 98 |
| Unmodified Control | 65.7 | 83.0 | 16.2 |

EXAMPLE 3

This example shows a blend of surface altering agent and rigid (unplasticized) PVC. 5 parts by weight of surface altering agent composition from Example 1 in granular form and 100 parts by weight of polyvinyl chloride having a K value of 61 and containing therein 12 parts by weight of an MBS type impact modifier (Acryloid KM 611), 3 parts by weight of an acrylic processing aid (Acryloid K120N), 2 parts by weight of dibutyltin mercaptoacetate, 0.75 parts by weight of glycerol monostearate and 0.75 parts by weight of partially saponified ester are mixed together and kneaded by a roll for 4 minutes at 350° F. at a speed differential of 20/20 RPM. A 35 mil sample is removed from the roll mill, back painted black to eliminate reflection from the second surface and the specular gloss measured at 60° angle of incidence. The balance of the stock is milled for an additional 3 minutes at 350° F. after which the kneaded mixture is molded into a 0.100 inch sheet at 350° F., 70 tons pressure with a cycle of 3 min. preheat/2 minutes press/3 minutes cooling. The molded sheet is tested for V-notch Izod impact strength, and further subjected to measurement for light transparency in comparison with molded sheet containing 5 parts of an inorganic surface-altering agent (amorphous silica gels) prepared by the same working conditions and a molded sheet containing no surface altering agent, polymeric or inorganic in nature. The results are shown in Table 2.

TABLE 2

| Additive | phr | 60° Gloss (%) | Izod Impact Strength (ft.-lb./in.) | Clarity %WL | %Haze |
|---|---|---|---|---|---|
| This invention | 5 | 5.5 | 15.6 | 78.1 | 9.2 |
| Amorphous Silica Gel | 5 | 7.8 | 0.72 | 37.1 | 100.0 |
| Unmodified Control | 0 | 13.9 | 22.5 | 73.0 | 11.1 |

As is apparent from the above table, the surface altering agent composition of this invention provides superior gloss reduction, impact strength and clarity over the amorphous silica gels.

EXAMPLE 4

The procedure and compositions disclosed in Example 1 are followed except that the amounts of styrene monomer and n-butyl acrylate monomer are 61.50 pounds and 7.29 pounds, respectively, and tested for gloss reduction according to the procedure used in Example 1, Table 1. The results are a 60° gloss (%) of 18.5.

EXAMPLE 5

The procedure and compositions disclosed in Example 1 are followed except that the amount of styrene monomer is 41.17 pounds and 27.62 pounds of 2-ethylhexylacrylate are substituted for the butyl acrylate, and tested for gloss reduction according to the procedure used in Example 1, Table 1. The results are a 60° gloss (%) of 11.0.

EXAMPLE 6

This example illustrates a suspension polymerization process for preparing the surface altering agent of the invention in a carrier polymer (endopolymer). The mixing procedure disclosed in Example 1 is followed using as the preformed polymer 266.2 grams of a copolymer of about 10% ethyl acrylate copolymerized with about 90% of methyl methacrylate. The monomer system in which the preformed polymer is dissolved consists of 430.2 grams of styrene monomer, 240.6 grams of n-butyl acrylate, and 27.62 grams of ethyl acrylate. The following ingredients are added to the syrup: 21.70 grams of allyl methacrylate, 7.202 grams of t-butyl peroxypivalate, and 7.202 grams of lauryl peroxide. In a suitable reaction vessel a mixture of 986.4 grams of deionized water, 7.864 grams of Amberlite W-1 suspending agent (Rohm and Haas Company), 1.380 grams of sodium nitrate, and 1.380 grams of potassium chloride is prepared. The monomer/polymer solution is then pumped into the vessel containing the aqueous solution. The mixture is subjected to intermittent agitation to form a stable suspension. The suspension is stirred at 300 rpm and polymerized at 70° C. for 1 hour, 80° C. for 1 hour, and 90° C. for 1 hour. The product suspension is cooled and isolated, and the resulting endopolymer/carrier beads are mostly between 0.085 and 0.0425 inches in diameter. The endopolymer is characterized by particle polymer spheres ranging from 1 to 33 microns in diameter with an average size of 6. The surface altering agent prepared is tested for gloss reduction according to the procedure used in Example 1, Table 1. The results are a 60° gloss (%) of 12.0.

EXAMPLE 7

The mixing procedure disclosed in Example 1 is followed dissolving 888 grams of the same carrier polymer in a monomer system consisting of 1464 grams of styrene monomer, 816 grams of n-butyl acrylate, and 96 grams of ethyl acrylate, then the following ingredients are added to the cooled syrup: 11.9 grams of 1,3-butylene glycol dimethacrylate, 2.4 grams of tertiarydodecylmercaptan, 0.86 grams of 2.8% aqueous oxalic acid, 4.8 grams of t-butyl peroxypivalate, 2.4 grams of 25% acetyl peroxide solution in dimethyl phthalate, and 4.8 grams of dicumyl peroxide. The resultant mixture is placed in a bag container and bulk polymerized in an air circulating oven for 16 hours at 66° C., 2 hours at 80° C., and then 6 hours at 120° C. After the bag is removed from the resulting opaque ½ inch slab of polymer the slab is broken and further granulated into particles capable of passing through a 5/16 inch mesh screen, and tested for gloss reduction according to the procedure used in Example 1. The results are 60° gloss (%) of 16.0.

EXAMPLE 8

The procedure and compositions disclosed in Example 6 are followed except that 5.9 grams of 1,3-butylene glycol diacrylate is used in place of the 1,3-butylene glycol dimethacrylate, and tested for gloss reduction according to the procedure used in Example 1, Table 1. The results are a 60° gloss (%) of 16.0.

EXAMPLE 9

The procedure and compositions disclosed in Example 6 are followed except that 11.9 grams of trimethylpropane trimethacrylate is used in place of the 1,3-butylene glycol dimethacrylate and tested for gloss reduction according to the procedure used in Example 1, Table 1. The results are a 60° gloss (%) of 14.0.

EXAMPLE 10

The procedure and compositions disclosed in Example 6 are followed except that 2.4 grams of divinylbenzene is used in place of the 1,3-butylene glycol dimethacrylate, and tested for gloss reduction according to the procedure used in Example 1, Table 1. The results are a 60° gloss (%) of 20.0.

EXAMPLE 11 (Comparative)

This example shows the importance of selecting the proper amount of cross-linking monomer, and its relation to properties obtained.

A. The procedure of Example 1 is followed only varying the amount of cross-linking agent, allyl methacrylate, and the following Table gives results of acetone extractables test swelling ratio, 60° gloss, and dispersion.

| % Cross-linker In Monomer Mixture | % Extractables (27% of Soluble, Preformed Carrier Polymer) | Swelling Ratio | 60° Gloss | Dispersion |
|---|---|---|---|---|
| 0 | 100 | — | 43 | Excellent |
| 0.5 | 78.5 | 44 | 56 | " |
| 0.75 | 58.9 | 16.4 | 71 | " |
| 1 | 51.2 | 10.3 | 16 | " |
| 1.5 | 39.2 | 6.4 | 12 | Grainy |
| 2 | 29.9 | 4.7 | 16 | Undispersed |
| 3 | 30.6 | 4.6 | 42 | " |

B. Surface altering agent was prepared by the carrier polymer technique of Example 1 but with styrene and divinyl benzene as the sole monomers, and was incorporated in the same manner in PVC. By varying the ratio of styrene to cross-linking monomer, varying results were obtained. At from 0 to 0.1% crosslinker in the monomer mixture, the surface altering agent was well dispersed in the PVC, and the 60° gloss was reduced from 91 for the PVC without surface altering agent, to 84, 76 and 58 respectively for 0, 0.05 and 0.1% cross-linker. At 0.5 to 1% cross-linker the dispersibility was poor to very poor and at 3 and 5% cross-linker, the surface altering agent could not be dispersed at all and the test sheets had large visible particles which indicated gross heterogeneity and lack of "surface altering" as defined in this specification.

I claim:

1. An extrudable, moldable or heat formable blend of a thermoplastic polymer and a surface altering agent for said thermoplastic polymer, said surface altering agent comprising cross-linked polymer particles having an average size of 1 to 30 microns, said surface altering agent prepared by polymerizing a monomer system which has a preformed polymer dissolved therein to form from said monomer system cross-linked surface altering agent polymeric particles of average size of about 1 to 30 microns dispersed in a continuous phase of said preformed polymer, said monomer system comprising about 86 to 99.95 percent by weight of at least one monoethylenically unsaturated monomer and about 0.05 to 4 percent by weight of at least one polyunsaturated cross-linking monomer.

2. The composition of claim 1 wherein said particles have a refractive index within about 0.005 units of the refractive index of the thermoplastic polymer.

3. The composition of claim 1 wherein the cross-linked polymer contains units from styrene or a ring-substituted styrene, a $C_4$-$C_8$ alkyl acrylate and a cross-linking agent of the formula:

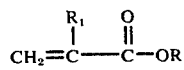

wherein $R_1$ is H or $CH_3$- and R is an ethylenically unsaturated radical.

4. The composition of claim 3 wherein the ratio of styrene or ring-substituted styrene to $C_4$-$C_8$ alkyl acrylates is at least 1.5.

5. The composition of claim 4 wherein the ratio of cross-linking agent to total units is 0.5/100 to 2/100.

6. The composition of claim 1 wherein said blend can be thermoformed without affecting the surface alteration.

7. The composition of claim 1 in the form of an extruded article, a sheet, an injected molded article, a blow molded article, a calendered sheet or film, or a lamina.

8. The composition of claim 1 wherein said surface altering agent comprises about 0.1 to 50 parts per 100 parts of blend.

9. The composition of claim 7 wherein said surface altering agent comprises about 1 to 10 parts per 100 parts of blend.

10. The composition of claim 2 wherein said thermoplastic polymer contains at least 80% vinyl chloride units.

11. The composition of claim 1 in the form of a flatted article.

12. The composition of claim 1 in the form of an article of improved scuff-resistance.

13. The composition of claim 2 in the form of an article of improved printability.

14. The composition of claim 1 in the form of an article having anti-blocking properties.

15. A method for altering the surface of thermoplastic polymer comprising blending therewith before or during processing cross-linked polymer particles having an average size of 1 to 30 microns, prepared by polymerizing a monomer system which has a preformed polymer dissolved therein to form from said monomer system cross-linked surface altering agent polymeric particles of average size of about 1 to 30 microns dispersed in a continuous phase of said preformed polymer, said monomer system comprising about 86 to 99.95 percent by weight of at least one monoethylenically unsaturated monomer and about 0.05 to 4 percent by weight of at least one polyunsaturated cross-linking monomer.

16. The method of claim 15 wherein said surface altering agent is prepared and introduced in a carrier polymer which is compatible with said thermoplastic polymer.

17. The composition of claim 1 wherein the thermoplastic polymer is selected from the group consisting of acrylonitrile-butadiene-styrene, methyl methacrylate-butadiene-styrene, nylon, polyethylene terephthalate, polyethylene, polypropylene, polycarbonate, poly(alkyl methacrylate), polyurethane, polystyrene, and blends of two or more of said polymers.

18. The method of claim 15 wherein said thermoplastic polymer is selected from the group consisting of acrylonitrile-butadiene-styrene, methyl methacrylate-butadiene-styrene, nylon, polyethylene terephthalate, polyethylene, polypropylene, polycarbonate, polyalkyl methacrylate, polyurethane, polystyrene, and blends of two or more of said polymers.

* * * * *